US012587661B2

(12) United States Patent
Xu et al.

(10) Patent No.: US 12,587,661 B2
(45) Date of Patent: Mar. 24, 2026

(54) VIDEO ENCODING METHOD, VIDEO DECODING METHOD, AND APPARATUS

(71) Applicant: HUAWEI TECHNOLOGIES CO., LTD., Shenzhen (CN)

(72) Inventors: Weiwei Xu, Hangzhou (CN); Jiantong Zhou, Shenzhen (CN); Quanhe Yu, Beijing (CN); Jinsong Wen, Shenzhen (CN); Yutong Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 18/604,710

(22) Filed: Mar. 14, 2024

(65) Prior Publication Data

US 2024/0223818 A1      Jul. 4, 2024

Related U.S. Application Data

(63) Continuation of application No. PCT/CN2022/117938, filed on Sep. 8, 2022.

(30) Foreign Application Priority Data

Sep. 15, 2021    (CN) .......................... 202111082879.5

(51) Int. Cl.
*H04N 19/30* (2014.01)
*G06T 5/40* (2006.01)
(Continued)

(52) U.S. Cl.
CPC .............. *H04N 19/30* (2014.11); *G06T 5/40* (2013.01); *H04N 19/119* (2014.11); *H04N 19/98* (2014.11)

(58) Field of Classification Search
CPC ...... H04N 19/30; H04N 19/119; H04N 19/98; H04N 19/184; H04N 19/186; H04N 19/197; H04N 19/44; G06T 5/40
See application file for complete search history.

(56) References Cited

U.S. PATENT DOCUMENTS 6,711,293 B1      3/2004  Lowe
2012/0314773 A1   12/2012  Gish et al.
(Continued)

FOREIGN PATENT DOCUMENTS

CA          3084154 A1 *  7/2019    .............. H04N 9/68
CN          103916673 A    7/2014
(Continued)

OTHER PUBLICATIONS

ITU-T: "Advanced video coding for generic audiovisual services." H.264. (Jun. 2019). total 836 pages.
(Continued)

*Primary Examiner* — Tracy Y. Li
(74) *Attorney, Agent, or Firm* — WOMBLE BOND DICKINSON (US) LLP

(57)      ABSTRACT

Embodiments of this application provide a video encoding method, a video decoding method, and an apparatus. The video encoding apparatus may obtain source data, where the source data includes first high dynamic range HDR data and a first standard dynamic range SDR bitstream for same video data; map reconstructed data of the first SDR bitstream to second HDR data based on a correspondence between the reconstructed data of the first SDR bitstream and the first HDR data; determine a target residual value between the second HDR data and the first HDR data, where a bit width of the target residual value is less than or equal to a data bit width for encoding a first SDR video into the first SDR bitstream; encode the correspondence and the target residual value, to determine preset data; and transmit the first SDR bitstream to which the preset data is added.

18 Claims, 4 Drawing Sheets

(51) Int. Cl.
    *H04N 19/119*     (2014.01)
    *H04N 19/98*     (2014.01)

(56)          References Cited

U.S. PATENT DOCUMENTS

| | | | | |
|---|---|---|---|---|
| 2013/0329778 | A1* | 12/2013 | Su | H04N 19/36 |
| | | | | 375/240.01 |
| 2015/0078661 | A1* | 3/2015 | Granados | G06T 5/92 |
| | | | | 382/167 |
| 2016/0301959 | A1 | 10/2016 | Oh et al. | |
| 2017/0085894 | A1* | 3/2017 | Ramasubramonian | |
| | | | | H04N 19/85 |
| 2023/0412813 | A1* | 12/2023 | Ferrara | H04N 19/33 |

FOREIGN PATENT DOCUMENTS

| | | | | | |
|---|---|---|---|---|---|
| CN | 110070508 | A | | 7/2019 | |
| CN | 111491168 | A | | 8/2020 | |
| KR | 20200106216 | A | * | 9/2020 | H04N 19/98 |
| WO | 2007082562 | A2 | | 7/2007 | |
| WO | 2015097124 | A1 | | 7/2015 | |

OTHER PUBLICATIONS

ITU-T: "High efficiency video coding." H.265. (Nov. 2019). total 712 pages.

\* cited by examiner

Reconstructed data            First HDR data

Reconstructed data            First HDR data

VIDEO ENCODING METHOD, VIDEO DECODING METHOD, AND APPARATUS

CROSS-REFERENCE TO RELATED APPLICATIONS

This application is a continuation of International Application No. PCT/CN2022/117938, filed on Sep. 8, 2022, which claims priority to Chinese Patent Application No. 202111082879.5, filed on Sep. 15, 2021. The disclosures of the aforementioned applications are hereby incorporated by reference in their entireties.

TECHNICAL FIELD

Embodiments of this application relate to the field of image processing technologies, and in particular, to a video encoding method, a video decoding method, and an apparatus.

BACKGROUND

In a digital image, a dynamic range indicates a ratio of a maximum grayscale value to a minimum grayscale value in a displayable range of the image. A dynamic range from $10^{-3}$ to $10^6$ is a high dynamic range (HDR). A dynamic range of a common image is a standard dynamic range (SDR). An imaging process of a digital camera is actually mapping from the high dynamic range to the standard dynamic range of a photo.

Dynamic-range mapping is mainly applied to a front-end HDR signal and a back-end HDR terminal display device. For example, an illumination signal captured by a front end is 4000 nits, and an HDR display capability of the back-end HDR terminal display device (television) is only 500 nits. Therefore, mapping the 4000-nit signal to the 500-nit device is dynamic-range mapping from high to low. For another example, a front end captures a 100-nit SDR signal, and a display end displays a 2000-nit television signal. Therefore, displaying the 100-nit signal on the 2000-nit device is dynamic-range mapping from low to high.

Currently, a large quantity of devices do not support the HDR, and display effect of an HDR signal on these devices is poor. Therefore, in a conventional technology, scalable encoding is used for video processing, in one embodiment, a same video is split into a plurality of videos with different resolutions for separate encoding. However, a plurality of hardware devices do not support scalable encoding, and scalable encoding requires a large data calculation amount. As a result, a large quantity of processor resources are wasted.

SUMMARY

This application provides a video encoding method, a video decoding method, and an apparatus, to improve video encoding efficiency while ensuring HDR display effect.

According to a first aspect, this application provides a video encoding method. The method may be performed by a video encoding apparatus. Generally, the video encoding apparatus may be a device that carries a camera lens or a processor, such as a video camera, a mobile phone, a tablet computer, a notebook computer, or a television. This is not limited herein in this application.

The video encoding apparatus may obtain source data, where the source data includes first high dynamic range HDR data and a first standard dynamic range SDR bitstream for same video data; map reconstructed data of the first SDR bitstream to second HDR data based on a correspondence between the reconstructed data of the first SDR bitstream and the first HDR data; determine a target residual value between the second HDR data and the first HDR data, where a bit width of the target residual value is less than or equal to a first bit width, and the first bit width is a data bit width for encoding a first SDR video into the first SDR bitstream; encode the correspondence and the target residual value, to determine preset data; and transmit the first SDR bitstream to which the preset data is added.

It should be noted that the first HDR data in the source data may be received by the video encoding apparatus from a device that is communicatively connected to the video encoding apparatus, or may be obtained through data processing of the video encoding apparatus for the same video data. This is not limited herein in this application. Generally, video data is large, and occupies a large quantity of bandwidth resources. The video data is encoded to obtain a video bitstream. During transmission, the video bitstream does not occupy a large quantity of bandwidth resources, and can ensure transmission efficiency of the data. Therefore, the video encoding apparatus does not directly transmit the video data, and needs to encode the video data to obtain the video bitstream for transmission. In addition, the video encoding apparatus usually obtains HDR data and SDR data, and encodes the SDR data to obtain an SDR bitstream (namely, the first SDR bitstream). During video encoding, the video data is usually converted into the video bitstream. This needs to meet a data bit width requirement of a device or the video data. A larger data bit width indicates a higher video data DR shown by the video bitstream and a higher image pixel. A smaller data bit width indicates a lower video data DR shown by the video bitstream and a lower image pixel. Generally, a data bit width for encoding the SDR data to obtain the SDR bitstream is 8 bits, and a data bit width for encoding the HDR data to obtain an HDR bitstream is 10 bits or 12 bits. In addition, a coding algorithm for the SDR data is not limited in this application, and may be any encoding/decoding algorithm such as MPEG-1, MPEG-2, MPEG-4, H.263, H.264, H.265, or JPEG.

The foregoing reconstructed data is SDR data obtained by decoding the first SDR bitstream. The reconstructed data is compared with the first HDR data, to determine the correspondence between the reconstructed data and the first HDR data. In an actual application, the correspondence may be determined by comparing a grayscale value, an RGB (red, green, blue) value, or a YUV value (luma and chroma values) of a video image. This is not limited herein in this application.

It should be noted that a data bit width corresponding to the HDR data and a data bit width corresponding to the SDR data are usually different in sizes. For example, the data bit width corresponding to the HDR data is 10 bits, and the data bit width corresponding to the SDR data is 8 bits. The video encoding apparatus may convert, according to a subtraction operation, a normalization operation, or the like, the target residual value between the first HDR data and the second HDR data into a data bit width that meets a transmission requirement of the first SDR bitstream. Because the data bit width corresponding to the SDR data is 8 bits, the data bit width of the target residual value is also 8 bits or less than 8 bits.

In this application, an SDR video decoding device and an HDR video decoding device are well supported based on the preset data and the SDR bitstream. If the bitstream is an SDR bitstream, the bitstream is explicitly identified as the SDR bitstream by the SDR video decoding device, to ensure SDR effect. Both the preset data and the SDR bitstream are correctly identified and decoded by the HDR device, to ensure HDR effect. It should be noted that, currently, large-bit width coding is not supported by all encoding/decoding standards. For example, JPEG supports only 8 bits, and both the target residual and an SDR are 8 bits. This can ensure that the video encoding apparatus and the video decoding apparatus can use a same-level codec. Generally, frame-level switching of a hardware encoder or a hardware decoder has high complexity and requires a high device processing capability. The target residual value is adjusted to be less than or equal to a bit width during encoding of the SDR bitstream. This can prevent frame-level switching of the hardware encoder or the hardware decoder at an encoder side and a decoder side.

In one embodiment, the correspondence may be determined in the following manner: determining a first average value from the reconstructed data and the first HDR data, where the first average value is determined based on a preset parameter of a pixel at a first location in the first HDR data and the reconstructed data; splitting the reconstructed data into a plurality of image blocks and the first HDR data into a plurality of image blocks, where quantities and locations of the image blocks of the reconstructed data are respectively the same as those of the first HDR data; determining a second average value corresponding to each image block of the reconstructed data and each image block of the first HDR data; and determining the correspondence based on the first average value or the second average value. The correspondence determined in this manner is more accurate, and the determined second HDR data is more reliable.

In one embodiment, the preset parameter is a grayscale value, an RGB value, or a YUV value. The preset parameter may alternatively be Y in YUV or L in Lab. This is not limited in this application.

In one embodiment, the video encoding apparatus may perform subtraction on the second HDR data and the first HDR data, to determine an initial residual value; determine a residual mapping manner and a clamping manner based on distribution of a value range of the initial residual value; and map, in the residual mapping manner and the clamping manner, the initial residual value to the target residual value whose bit width is less than or equal to the first bit width.

It should be noted that the initial residual value is obtained through subtraction of grayscale values, RGB values, or YUV values at same locations in the second HDR data and the first HDR data. Values obtained through subtraction may be different. Statistical analysis may be performed on the initial residual value to obtain a histogram, and the histogram shows the distribution of the value range of the initial residual value. In an actual application, a curve chart is obtained by drawing dots without providing the initial residual value to show the distribution of the value range of the initial residual value. A manner of displaying the distribution of the value range of the initial residual value is not limited herein in this application.

In addition, when the initial residual value is converted into the target residual value, some values with a large error in an intermediate calculation process may affect a calculation result, and impact caused by the initial residual value with a large error during calculation may be eliminated in the clamping manner. Then, the video encoding apparatus may map the initial residual value to the target residual value in the residual mapping manner and the clamping manner that are determined based on the distribution of the value range of the initial residual value.

In one embodiment, the video encoding apparatus may determine a histogram based on the initial residual value; determine a residual value corresponding to a central location of the histogram; determine a first value range based on the first bit width and the residual value corresponding to the central location of the histogram; determine, based on the distribution of the value range of the initial residual value, a target proportion value of an initial residual that falls within the first value range; and perform residual mapping on the initial residual that falls within the first value range, and clamp an initial residual that does not fall within the first value range.

It should be noted that, after determining the distribution of the value range of the initial residual value, the video encoding apparatus may determine the first value range based on a value of the first bit width. The initial residual value within the first value range may be mapped to the target residual value whose bit width is less than or equal to the first bit width.

In one embodiment, the video encoding apparatus may determine a first residual value and a second residual value based on the target proportion value and the residual value corresponding to the central location of the histogram, where the first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value; and map an initial residual value that falls between the first residual value and the second residual value to the target residual value, and clamp an initial residual value that does not fall between the first residual value and the second residual value, to obtain a preset value.

The first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value.

It should be noted that, currently, large-bit width coding is not supported by all encoding/decoding standards. For example, JPEG supports only 8 bits, and both the target residual and an SDR are 8 bits. This can ensure that the video encoding apparatus and the video decoding apparatus can use a same-level codec. Generally, frame-level switching of a hardware encoder or a hardware decoder has high complexity and requires a high device processing capability. The target residual value is adjusted to be less than or equal to a bit width during encoding of the SDR bitstream. This can prevent frame-level switching of the hardware encoder or the hardware decoder at an encoder side and a decoder side.

According to a second aspect, this application provides a video decoding method. The method may be performed by using a video decoding apparatus. Generally, the video decoding apparatus may be a device that carries a display or a processor, such as a mobile phone, a tablet computer, a notebook computer, or a television. This is not limited herein in this application.

The video decoding apparatus may receive the first SDR bitstream, where the first SDR bitstream includes preset data, and the preset data is obtained by encoding a correspondence and a target residual value; map reconstructed data of the first SDR bitstream to second HDR data based on the correspondence; and determine first HDR data based on the target residual value and the second HDR data.

In one embodiment, the preset data further includes a residual mapping manner and a clamping manner.

In one embodiment, the video decoding apparatus may determine a first residual value and a second residual value based on the residual mapping manner, the clamping manner, the target residual value, and a first bit width; determine an initial residual value based on the first residual value, the second residual value, and the clamping manner, where a bit width of the initial residual value is greater than or equal to the first bit width; and determine the first HDR data based on the initial residual value and the second HDR data.

According to a third aspect, this application provides a video encoding apparatus, including:

a processing unit, configured to: obtain source data, where the source data includes first high dynamic range HDR data and a first standard dynamic range SDR bitstream for same video data; map reconstructed data of the first SDR bitstream to second HDR data based on a correspondence between the reconstructed data of the first SDR bitstream and the first HDR data; determine a target residual value between the second HDR data and the first HDR data, where a bit width of the target residual value is less than or equal to a first bit width, and the first bit width is a data bit width for encoding a first SDR video into the first SDR bitstream; and encode the correspondence and the target residual value, to determine preset data; and an input/output unit, configured to transmit the first SDR bitstream to which the preset data is added.

According to a fourth aspect, this application provides a video decoding apparatus, including:

an input/output unit, configured to receive a first SDR bitstream, where the first SDR bitstream includes preset data, and the preset data is obtained by encoding a correspondence and a target residual value; and a processing unit, configured to: map reconstructed data of the first SDR bitstream to second HDR data based on the correspondence, and determine first HDR data based on the target residual value and the second HDR data.

According to a fifth aspect, an embodiment of this application provides a video encoding apparatus, including a nonvolatile memory and a processor that are coupled to each other, where the processor invokes program code stored in the memory to perform the method in any one of the first aspect or the embodiments of the first aspect.

According to a sixth aspect, an embodiment of this application provides a video decoding apparatus, including a nonvolatile memory and a processor coupled to each other, where the processor invokes program code stored in the memory to perform the method in any one of the second aspect or the embodiments of the second aspect. It should be noted that the processor does not perform an encoding operation.

According to a seventh aspect, an embodiment of this application provides an image processing system, including the video encoding apparatus in the fifth aspect and the video decoding apparatus in the sixth aspect.

According to an eighth aspect, an embodiment of this application provides a computer-readable storage medium. The computer-readable storage medium stores program code, where the program code includes instructions for performing a part or all of operations in either of the methods in the first aspect or the second aspect.

According to a ninth aspect, an embodiment of this application provides a computer program product. When the computer program product runs on a computer, the computer is enabled to perform a part or all of the operations in either of the methods in the first aspect or the second aspect.

It should be understood that, for beneficial effect of the second aspect to the ninth aspect of this application, refer to related descriptions of the first aspect. Details are not described again.

DESCRIPTION OF EMBODIMENTS

To make objectives, technical solutions, and advantages of this application clearer, the following further describes this application in detail with reference to accompanying drawings. An operation method in a method embodiment may also be applied to an apparatus embodiment or a system embodiment. In the descriptions of this application, unless otherwise specified, "a plurality of" means two or more than two. Therefore, for implementations of the apparatus and the method, refer to each other, and no repeated description is provided.

In this application, the term "and/or" describes an association relationship between associated objects and may indicate that three relationships may exist. For example, A and/or B may indicate the following cases: Only A exists, both A and B exist, and only B exists, where A and B may be singular or plural. In addition, unless otherwise stated, ordinal numbers such as "first" and "second" in embodiments of this application are used for distinguishing between a plurality of objects, but are not intended to limit an order, a time sequence, priorities, or importance of the plurality of objects.

Reference to "one embodiment", "some embodiments", or the like described in the specification of this application means that one or more embodiments of this application include a feature, structure, or feature described with reference to the embodiment. Therefore, statements such as "in one embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "contain", "have", and variants thereof all mean "include but are not limited to", unless otherwise emphasized in another manner.

Figure 1:
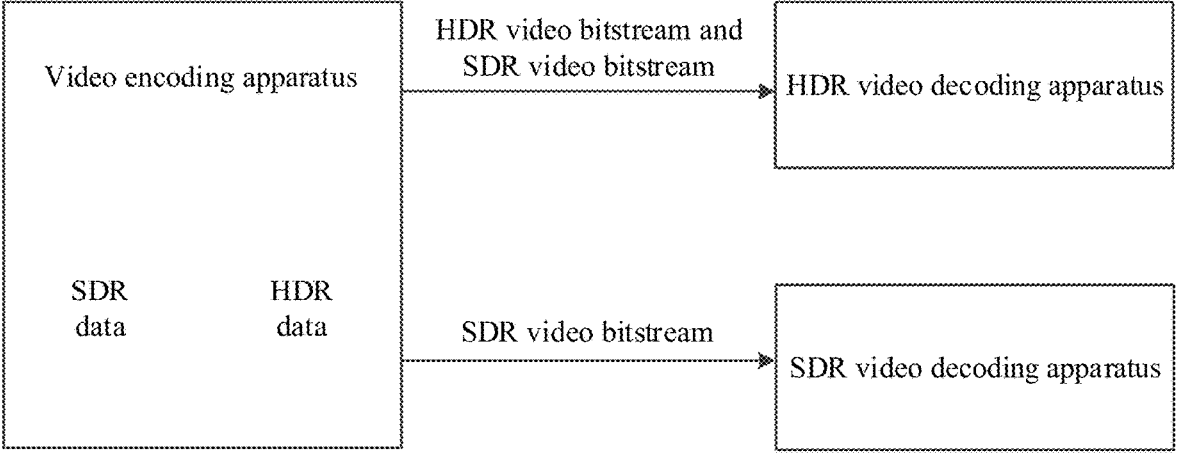
FIG. 1 is a schematic diagram of an image processing system according to an embodiment of this application.

FIG. 1 shows an image processing system to which an embodiment of this application may be applied. The system includes a video encoding apparatus, an HDR video decoding apparatus, and an SDR video decoding apparatus. There may be a plurality of video encoding apparatuses and a plurality of video decoding apparatuses. This is not limited herein in this application. The video encoding apparatus may be configured to: capture video data, and encode the video data, to obtain an HDR video bitstream and an SDR video bitstream. The HDR video decoding apparatus may receive the HDR video bitstream and/or the SDR video bitstream, and decode the HDR video bitstream and/or the SDR video bitstream into video data. The SDR video decoding apparatus may receive the SDR video bitstream, and decode the SDR video bitstream into video data. The video encoding apparatus may be a device that carries a camera lens or a processor, such as a video camera, a mobile phone, a tablet computer, a notebook computer, or a television. The video decoding apparatus may be a device that carries a display or a processor, such as a mobile phone, a tablet computer, a notebook computer, or a television. For a same image, the video encoding apparatus may obtain images of different DRs by adjusting an image capture manner. For example, an SDR image 1 (a DR of an SDR image is generally between 1 nit and 100 nits) is determined based on a shooting parameter 1 (4 exposure value (EV) to 12 EV), an SDR image 2 is determined based on a shooting parameter 2 (8 EV to 16 EV), and an HDR image (a DR of the HDR image is generally between 0.001 nit and 10000 nits) may be determined based on the image 1 and the image 2. A shooting parameter corresponding to the HDR image may be 4 EV to 16 EV. Similarly, because a video includes a plurality of frames of consecutive images, a video capturing apparatus may determine an HDR video and an SDR video for a same video. In addition, the video encoding apparatus may further determine the HDR video and the SDR video in another manner, for example, an artificial intelligence-based method. This is not limited herein in this application. In FIG. 1, an example in which the video encoding apparatus may obtain SDR data (a video or an image) and HDR data is used for description.

EV is a unit that indicates exposure. When photosensitivity is 100, an F-number is F1, and exposure time is one second, the exposure is defined as 0. Based on the exposure, the exposure is reduced by one level (the exposure time is reduced by half or an aperture is reduced by one level), and the EV value is increased by 1.

An exposure equation 1 is as follows:

$$2^{AV} * 2^{TV} = 2^{BV} * 2^{SV} \qquad \text{Equation 1}$$

$$AV + TV = BV + SV$$

A indicates an F-number of a lens, T indicates shutter time (seconds), B indicates scene brightness, and S indicates film photosensitivity. In photography, EV indicates a sum of AV+TV or a sum of BV+SV. The EV value, namely, "the exposure value", is an abstract concept and represents a combination of an aperture and a shutter. The aperture and a shutter speed may be freely selected. If the aperture is large, the shutter time needs to be shorter; if the aperture is small, the shutter time needs to be longer. However, as long as the combination of the aperture and shutter meets conditions to ensure that the EV value is constant, final exposure is the same. Each time the EV value is increased by 1.0, an amount of incident light is doubled.

It should be noted that, in the H.265 standard, video encoding supports encoding and displaying of HDR data whose bit width is 10 bits. However, a large quantity of devices do not support an HDR. A software application cannot identify HDR data, and a software application client cannot display good effect of the HDR data. In addition, in the standards MPEG-2, MPEG-4, H.264, and H.265, there is a solution related to scalable encoding, in one embodiment, a same video is split into a plurality of videos with different resolutions for separate encoding. However, a plurality of hardware devices do not support scalable encoding, and scalable encoding requires a large data calculation amount. As a result, a large quantity of processor resources are wasted.

Figure 2:
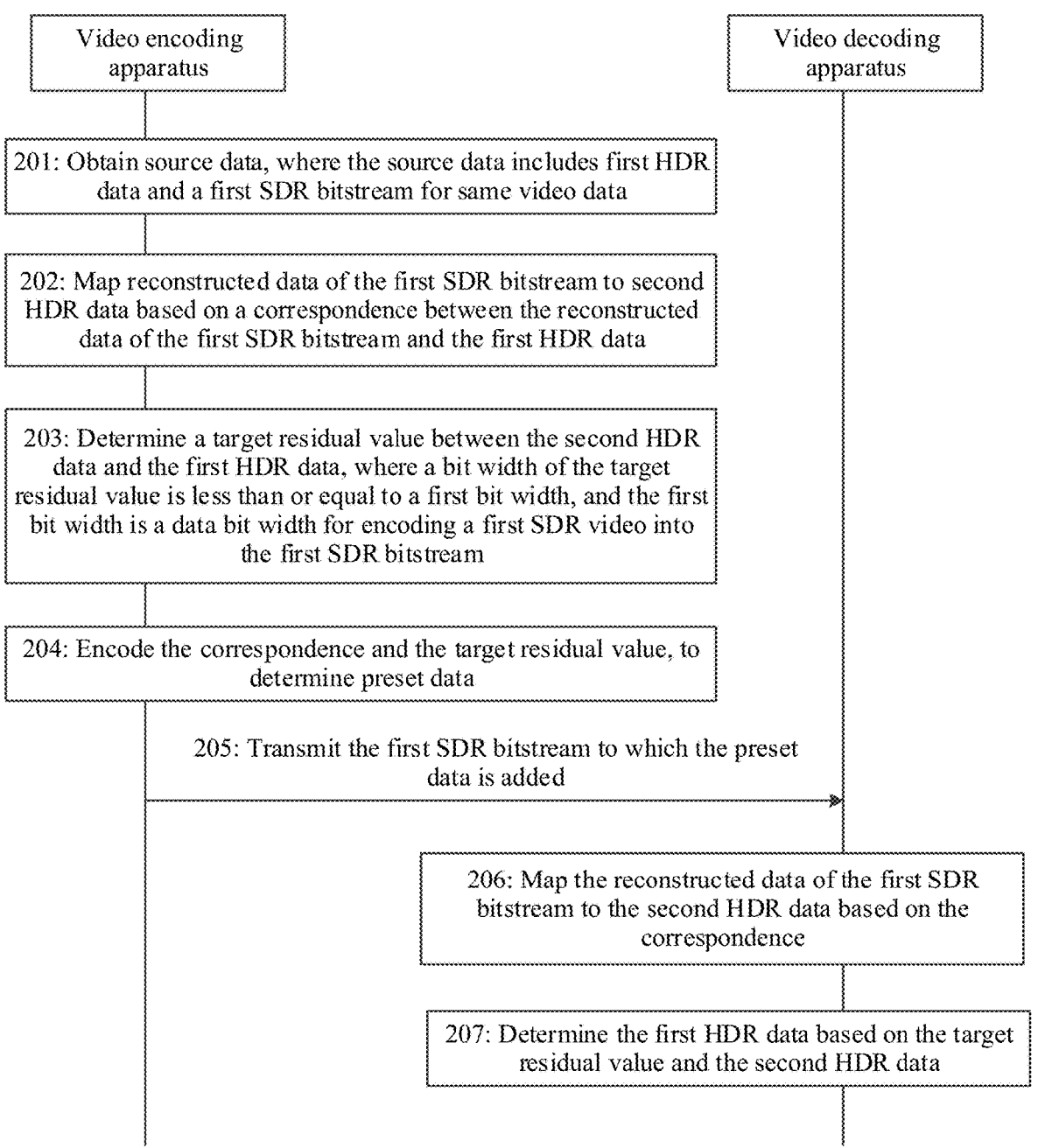
FIG. 2 is a schematic flowchart of a video encoding method and a video decoding method according to an embodiment of this application.

In view of the foregoing cases, this application provides a video encoding method and a video decoding method, to improve video coding efficiency and improve user experience. Refer to FIG. 2. The method is performed by using a video encoding apparatus and a video decoding apparatus. The video encoding apparatus may perform the video encoding method, and the video decoding apparatus may perform the video decoding method. The following operations are performed.

Operation 201: The video encoding apparatus obtains source data, where the source data includes first HDR data and a first SDR bitstream for same video data.

It should be noted that the first HDR data in the source data may be received by the video encoding apparatus from a device that is communicatively connected to the video encoding apparatus, or may be obtained through data processing of the video encoding apparatus for the same video data. This is not limited herein in this application. Generally, video data is large, and occupies a large quantity of bandwidth resources. The video data is encoded to obtain a video bitstream. During transmission, the video bitstream does not occupy a large quantity of bandwidth resources, and can ensure transmission efficiency of the data. Therefore, the video encoding apparatus does not directly transmit the video data, and needs to encode the video data to obtain the video bitstream for transmission. In addition, the video encoding apparatus usually obtains HDR data and SDR data, and encodes the SDR data to obtain an SDR bitstream (namely, the first SDR bitstream). During video encoding, the video data is usually converted into the video bitstream. This needs to meet a data bit width requirement of a device or the video data. A larger data bit width indicates a higher video data DR shown by the video bitstream and a higher image pixel. A smaller data bit width indicates a lower video data DR shown by the video bitstream and a lower image pixel. Generally, a data bit width for encoding the SDR data to obtain the SDR bitstream is 8 bits, and a data bit width for encoding the HDR data to obtain an HDR bitstream is 10 bits or 12 bits. In addition, a coding algorithm for the SDR data is not limited in this application, and may be any encoding/decoding algorithm such as MPEG-1, MPEG-2, MPEG-4, H.263, H.264, H.265, or JPEG.

Operation 202: The video encoding apparatus maps reconstructed data of the first SDR bitstream to second HDR data based on a correspondence between the reconstructed data of the first SDR bitstream and the first HDR data.

The foregoing reconstructed data is SDR data obtained by decoding the first SDR bitstream. The reconstructed data is compared with the first HDR data, to determine the correspondence between the reconstructed data and the first HDR data. In an actual application, the correspondence may be determined by comparing a grayscale value, an RGB value, or a YUV value of a video image. This is not limited herein in this application.

In an optional embodiment, the correspondence may be determined in the following manner:

The video encoding apparatus may determine a first average value from the reconstructed data and the first HDR data, where the first average value is determined based on a preset parameter of a pixel at a first location in the first HDR data and the reconstructed data. The video encoding apparatus may split the reconstructed data into a plurality of image blocks and the first HDR data into a plurality of image blocks, where quantities and locations of the image blocks of the reconstructed data are respectively the same as those of the first HDR data; determine a second average value corresponding to each image block of the reconstructed data and each image block of the first HDR data; and determine the correspondence based on the first average value or the second average value. The correspondence determined in this manner is more accurate, and the determined second HDR data is more reliable.

Figure 3:
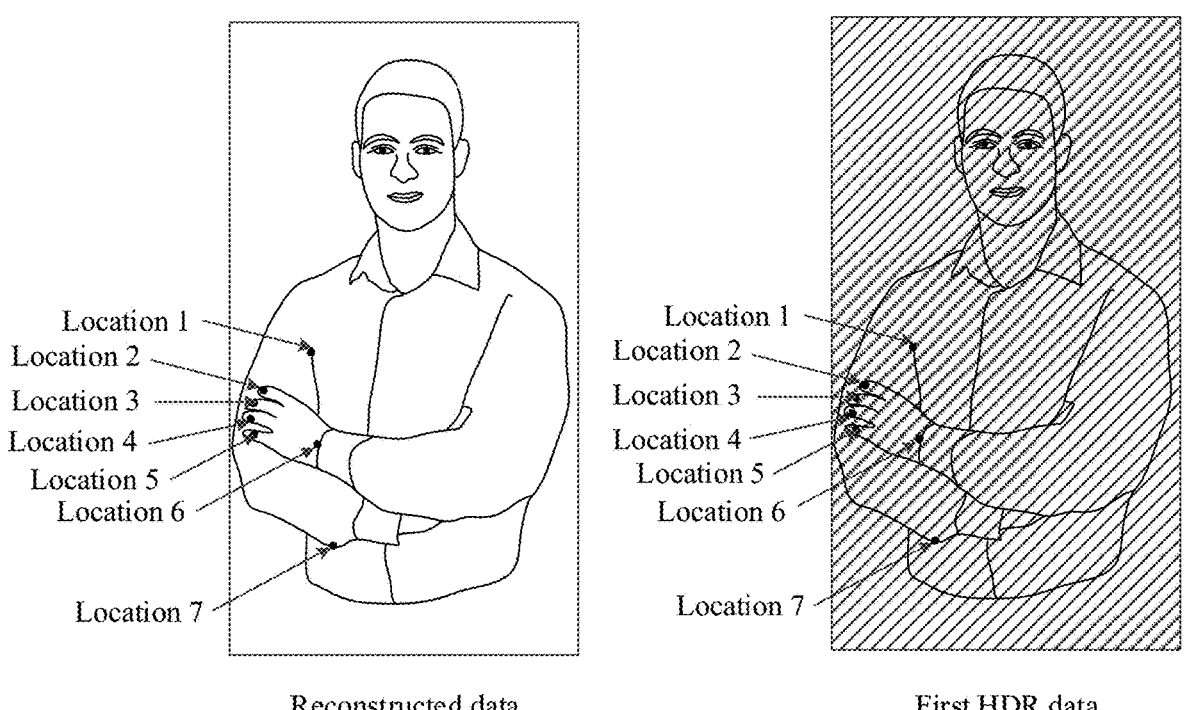
FIG. 3 is a schematic diagram of reconstructed data and first HDR data according to an embodiment of this application.

The preset parameter may be a grayscale value, an RGB value, Y in YUV, or L in Lab. This is not limited in this application. The grayscale value is used as an example herein for illustration. During actual execution, the video encoding apparatus may collect statistics on statistical histograms His[i] of grayscale values of pixels, corresponding to grayscale values I at locations in the reconstructed data, at corresponding locations in the first HDR data, and an average value avg[i] and a variance var[i] of the grayscale values. In an actual application, image elements at corresponding locations in the reconstructed data and the first HDR data are the same, and only pixels or DRs are different. As shown in FIG. 3, both image elements corresponding to locations A in the reconstructed data and the first HDR data include a number 1. During calculation, an average value of grayscale values corresponding to the locations A, namely, the first average value, may be determined. For example, if the grayscale value I appears at seven locations such as locations 1, 2, 3, 4, 5, 6, and 7 in the reconstructed data, a grayscale value 1, a grayscale value 2, . . . , a grayscale value 7 at locations 1, 2, 3, 4, 5, 6, and 7 in the first HDR data (or an image block of the first HDR data) are searched for. In this case, an average value of grayscale values, corresponding to the grayscale value I, in the first HDR data (or the image block of the first HDR data) is (grayscale value 1+grayscale value 2+ . . . +grayscale value 7)/7. In FIG. 3, the first HDR data is indicated by a shadow part, and the SDR data is indicated by a shadowless part.

In addition, if the variance calculated for all locations is less than a total variance (that is, a variance of an entire frame of image), and the variance calculated for all locations is greater than a first preset value, the video encoding apparatus may split a corresponding image of the reconstructed data into a plurality of image blocks and a corresponding image of the first HDR data into a plurality of image blocks, and calculate statistical histograms subHis[i] of the image blocks, and an average value subAvg[i] and a variance subVar[i] of grayscale values. The first preset value may be set based on an actual application requirement. This is not limited herein in this application. For example, because a bit width of the SDR data is 8 bits, a target residual should be limited to 8 bits, and the first preset value is 128.

Figure 4:
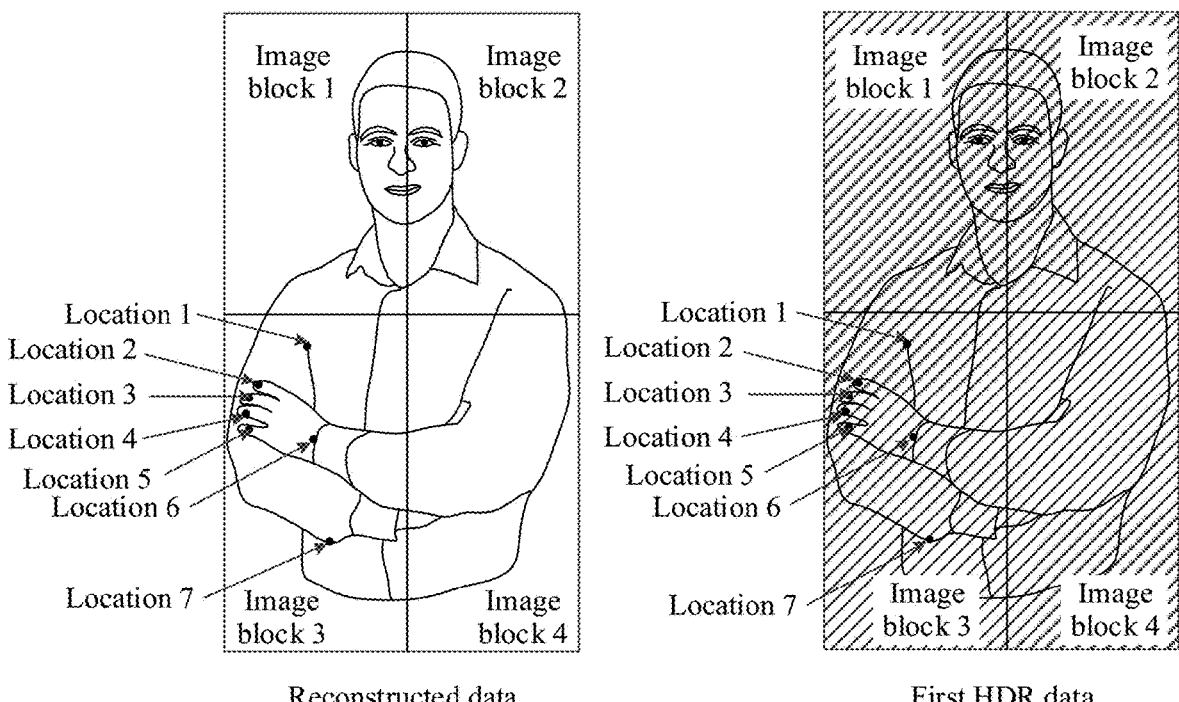
FIG. 4 is another schematic diagram of reconstructed data and first HDR data according to an embodiment of this application.

For example, if the reconstructed data is split into 4*4 image blocks, the first HDR data also needs to be split into 4*4 image blocks, and sizes of corresponding image blocks of the two pieces of data are the same. As shown in FIG. 4, an image corresponding to the reconstructed data is split into four image blocks, an image corresponding to the first HDR data is also split into four image blocks, and image elements in an image block 1 of the reconstructed data and an image block 1 of the first HDR data are the same. In an actual application, the image blocks may alternatively be unevenly allocated, in one embodiment, the image block 1 of the reconstructed data may have a different size from an image block 1 of other reconstructed data, as long as it is ensured that the image block 1 of the reconstructed data and the image block 1 of the first HDR data have a same size and the image elements are the same.

In an actual application, a local grayscale/tone mapping relationship may be obtained based on avg[i] or subAvg[i], and then the local grayscale/tone mapping relationship is processed according to a preset rule, to obtain an approximately global grayscale/tone mapping relationship, namely, the correspondence. The preset rule may be performing weighted calculation on a local mapping relationship to determine a correspondence, or may be another method. This is not limited herein in this application. For example, the preset rule is that local grayscale/tone mapping values are weighted by using a difference value between a local histogram and a global histogram as a weight, to obtain a global grayscale/tone mapping value. In addition, the grayscale/tone mapping relationship may be indicated by any curve or matrix parameter. This is not limited herein in this application.

Operation 203: The video encoding apparatus determines a target residual value between the second HDR data and the first HDR data, where a bit width of the target residual value is less than or equal to a first bit width, and the first bit width is a data bit width for encoding the first SDR video into the first SDR bitstream.

It should be noted that a data bit width corresponding to the HDR data and a data bit width corresponding to the SDR data are usually different in sizes. For example, the data bit width corresponding to the HDR data is 10 bits, and the data bit width corresponding to the SDR data is 8 bits. The video encoding apparatus may convert, using a subtraction operation, a normalization operation, or the like, the target residual value between the first HDR data and the second HDR data into a data bit width that meets a transmission requirement of the first SDR bitstream. Because the data bit width corresponding to the SDR data is 8 bits, the data bit width of the target residual value is also 8 bits or less than 8 bits.

In an optional embodiment, the video encoding apparatus may perform subtraction on the second HDR data and the first HDR data, to determine an initial residual value; determine a residual mapping manner and a clamping manner based on distribution of a value range of the initial residual value; and map, in the residual mapping manner and the clamping manner, the initial residual value to the target residual value whose bit width is less than or equal to the first bit width.

It should be noted that the initial residual value is obtained through subtraction of grayscale values, RGB values, or YUV values at same locations in the second HDR data and the first HDR data. Values obtained through subtraction may be different. Statistical analysis may be performed on the initial residual value to obtain a histogram, and the histogram shows the distribution of the value range of the initial residual value. In an actual application, a curve chart is obtained by drawing dots without providing the initial residual value to show the distribution of the value range of the initial residual value. A manner of displaying the distribution of the value range of the initial residual value is not limited herein in this application.

In addition, during conversion of the initial residual value into the target residual value, some values with a large error in an intermediate calculation process may affect a calculation result, and impact caused by the initial residual value with a large error during calculation may be eliminated in the clamping manner. Then, the video encoding apparatus may map the initial residual value to the target residual value in the residual mapping manner and the clamping manner that are determined based on the distribution of the value range of the initial residual value.

In an optional embodiment, the video encoding apparatus may determine a histogram based on the initial residual value; determine a residual value corresponding to a central location of the histogram; determine a first value range based on the first bit width and the residual value corresponding to the central location of the histogram; determine, based on the distribution of the value range of the initial residual value, a target proportion value of an initial residual that falls within the first value range; and perform residual mapping on the initial residual that falls within the first value range, and clamp an initial residual that does not fall within the first value range.

It should be noted that, after determining the distribution of the value range of the initial residual value, the video encoding apparatus may determine the first value range based on a value of the first bit width. The initial residual value within the first value range may be mapped to the target residual value whose bit width is less than or equal to the first bit width. During actual execution, refer to the following procedures.

A. Collect statistics on a histogram of the initial residual value.

B. Determine a residual value Y corresponding to a central location of the histogram.

C. Determine the first value range. A critical value Ylow is found based on the residual value Y at the central location in a direction in which the residual value is less than Y, and another critical value Yhigh is found in a direction in which the residual value is greater than Y. An initial residual value between the two critical values may be mapped to a target residual value, and the two critical values may be defined as the first value range. The first value range may be determined by subtracting a shift value of the first bit width to or adding the shift value of the first bit width to the value Y. For example, if the first bit width is 8 bits, and corresponds to $2^8$ (0 to 255), 1 is shifted leftward by 8 bits and then 1 bit is subtracted, to obtain 128, that is, a critical value of the first value range is Y−128, and correspondingly, another critical value is Y+128−1.

D. Determine a proportion value of the initial residual that falls within the first value range. For example, if it is determined that a proportion of the initial residual value that falls within the first value range is 99%, it may be determined whether an initial residual value corresponding to 1% of the histogram falls within the first value range. If yes, it is determined whether an initial residual corresponding to 100% of the histogram falls within the first value range, and an initial residual corresponding to 1% to 100% may be mapped to a target residual value. Alternatively, an initial residual value corresponding to A % may be selected before the residual value Y when it is determined that the proportion value is 99%, an initial residual value corresponding to B % may be selected after the residual value A, and A % to B % are equal to 99%. For example, A % is 0%, and B % is 99%; A % is 0.5%, B is 99.5%; and the like. Both the initial residual value corresponding to A % and the initial residual value corresponding to B % fall within the first value range. This is not limited herein in this application.

E. Map the initial residual value that falls within the first value range to the target residual value.

In an optional embodiment, the video encoding apparatus may determine a first residual value and a second residual value (which may be understood as the foregoing two critical values) based on the target proportion value and the residual value corresponding to the central location of the histogram, map an initial residual value between the first residual value and the second residual value to the target residual value, and clamp an initial residual value that does not fall between the first residual value and the second residual value to a preset value.

The first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value. The following uses an example for description. If there are two first residual values, there are also two second residual values, the first residual values are Ylow and Ylow1, and the second residual values are Yhigh and Yhigh1. It is assumed that the target proportion value is 98%, a location of K %, for example, 1%, of histogram distribution may be selected for Ylow1; and a location of N %, for example, 99%, of the histogram distribution may be selected for Yhigh1. If the target proportion value is greater than 90%, a location of L %, for example, 5%, of the histogram distribution may be selected for Ylow; and a location of M %, for example, 95%, of the histogram distribution may be selected for Yhigh.

For residual mapping, refer to the following methods.

Method 1:

An initial residual value within (Ylow, Yhigh) is equal to an original value+(1<<(Bitdepth−1))−Y. A residual within (Ylow1, Ylow) is mapped to (0, Ylow+(1<<(Bitdepth−1))−Y). A residual within (Yhigh, Yhigh1) is mapped to (Yhigh+(1<<(Bitdepth−1))−Y, (1<<(Bitdepth))−1). A residual value less than Ylow1 is clamped to 0, and a residual value greater than Yhigh1 is clamped to (1<<Bitdepth)−1.

Method 2:

A residual within (Y–(1<<(Bitdepth–1)), Y+(1<<(Bit-depth–1))–1) is equal to the original value+(1<<(Bitdepth–1))–Y. A residual less than Y–(1<<(Bitdepth–1)) is clamped to 0. A residual greater than Y+(1<<(Bitdepth–1))–1 is clamped to (1<<Bitdepth)–1.

Bitdepth indicates the value of the first bit width. For example, the first bit width is 8 bits, corresponding Bitdepth is 8, a value of Y is 0, Ylow is –100, and Yhigh is 90. When the method 1 is used, the initial residual value within (Ylow, Yhigh) may be, for example, 90, during mapping, 90+(1<<(Bitdepth–1))–0 may be performed, and 218 (90+128–0) is determined as a target residual value to which 90 is mapped; and the initial residual value within (Ylow, Yhigh) may be, for example, –100, during mapping, –100+(1<<(Bitdepth–1))–0 may be performed, and 28 (–100+128–0) is determined as a target residual value to which –100 is mapped. For example, if Ylow1 is –300, an initial residual value within (Ylow, Ylow1), for example, (–300, –100) is mapped to (0, 28), and an initial residual value within (Yhigh, Yhigh1), for example, (90, 400) may be mapped to (218, 255). A residual value less than Ylow1 is clamped to 0, and a residual value greater than Yhigh1 is clamped to 255.

When the method 2 is used, 128–Y may be directly added to an initial residual value within (Y–128, Y+127) to obtain the target residual value, an initial residual value less than Y–128 may be directly clamped to 0, and an initial residual value greater than Y+127 may be directly clamped to 255.

It should be noted that, currently, large-bit width coding is not supported by all encoding/decoding standards. For example, JPEG supports only 8 bits, and both the target residual and an SDR are 8 bits. This can ensure that the video encoding apparatus and the video decoding apparatus can use a same-level codec. Generally, frame-level switching of a hardware encoder or a hardware decoder has high complexity and requires a high device processing capability. The target residual value is adjusted to be less than or equal to a bit width during encoding of the SDR bitstream. This can prevent frame-level switching of the hardware encoder or the hardware decoder at an encoder side and a decoder side.

Operation 204: The video encoding apparatus encodes the correspondence and the target residual value, to determine preset data.

It should be noted that the preset data may be understood as user-defined data. After obtaining the preset data, the video decoding apparatus may convert the SDR data into the HDR data during bitstream decoding.

Operation 205: The video encoding apparatus transmits the first SDR bitstream to which the preset data is added. Correspondingly, the video decoding apparatus receives the first SDR bitstream.

Operation 206: The video decoding apparatus maps the reconstructed data of the first SDR bitstream to the second HDR data based on the correspondence.

Operation 207: The video decoding apparatus determines the first HDR data based on the target residual value and the second HDR data.

In an optional embodiment, the preset data further includes the residual mapping manner and the clamping manner. The video decoding apparatus may determine the first residual value and the second residual value based on the residual mapping manner, the clamping manner, the target residual value, and the first bit width; determine the initial residual value based on the first residual value, the second residual value, and the clamping manner, where a bit width of the initial residual value is greater than or equal to the first bit width; and determine the first HDR data based on the initial residual value and the second HDR data.

During execution, the target residual value may be restored to the initial residual value according to the following methods, namely, an inverse operation of residual mapping of the foregoing video encoding apparatus:

Method 1:

A residual value within (0, Ylow+(1<<(Bitdepth–1))–Y) is mapped to (Ylow1, Ylow); a residual value within (Yhigh+(1<<(Bitdepth–1))–Y), (1<<Bitdepth)–1) is mapped to (Yhigh, Yhigh1); and Y–(1<<(Bitdepth–1)) is added to a residual value within (Ylow+(1<<(Bitdepth–1))–Y, Yhigh+(1<<(Bitdepth–1))–Y).

Method 2:

Y–(1<<(Bitdepth–1)) is added to each of all target residual values.

Bitdepth indicates the value of the first bit width. For example, the first bit width is 8 bits, corresponding Bitdepth is 8, a value of Y is 0, Ylow is –100, and Yhigh is 90. When the method 1 is used, a target residual value within (0, 28) may be mapped to (–300, –100), a target residual value within (90+128, 255) may be mapped to (90, 400), and an initial residual value is determined by subtracting 128 from a target residual value within (–100+128, 90+128).

When the method 2 is used, an initial residual value, namely, an initial bit width of 10 bits, may be obtained by adding Y–128 to a target residual value.

In this application, an SDR video decoding device and an HDR video decoding device are well supported based on the preset data and the SDR bitstream. If the bitstream is an SDR bitstream, the bitstream is explicitly identified as the SDR bitstream by the SDR video decoding device, to ensure SDR effect. Both the preset data and the SDR bitstream are correctly identified and decoded by the HDR device, to ensure HDR effect.

Figure 5:
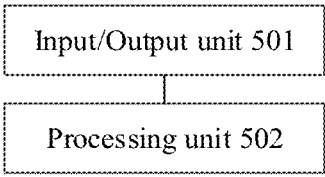
FIG. 5 is a schematic diagram of a structure of an image processing apparatus according to an embodiment of this application.

In addition, FIG. 5 shows an image processing apparatus further provided in this application. The apparatus may be a video encoding apparatus or a video decoding apparatus. This is not limited herein in this application. The image processing apparatus may include an input/output unit 501 and a processing unit 502.

When the image processing apparatus is a video encoding apparatus, the processing unit 502 is configured to: obtain source data, where the source data includes first high dynamic range HDR data and a first standard dynamic range SDR bitstream for same video data; map reconstructed data of the first SDR bitstream to second HDR data based on a correspondence between the reconstructed data of the first SDR bitstream and the first HDR data; determine a target residual value between the second HDR data and the first HDR data, where a bit width of the target residual value is less than or equal to a first bit width, and the first bit width is a data bit width for encoding a first SDR video into the first SDR bitstream; and encode the correspondence and the target residual value, to determine preset data; and the input/output unit 501 is configured to transmit the first SDR bitstream to which the preset data is added.

It should be noted that the first HDR data in the source data may be received by the video encoding apparatus from a device that is communicatively connected to the video encoding apparatus, or may be obtained through data processing of the video encoding apparatus for the same video data. This is not limited herein in this application. Generally, video data is large, and occupies a large quantity of bandwidth resources. The video data is encoded to obtain a video bitstream. During transmission, the video bitstream does not occupy a large quantity of bandwidth resources, and can ensure transmission efficiency of the data. Therefore, the video encoding apparatus does not directly transmit the video data, and needs to encode the video data to obtain the video bitstream for transmission. In addition, the video encoding apparatus usually obtains HDR data and SDR data, and encodes the SDR data to obtain an SDR bitstream (namely, the first SDR bitstream). During video encoding, the video data is usually converted into the video bitstream. This needs to meet a data bit width requirement of a device or the video data. A larger data bit width indicates a higher video data DR shown by the video bitstream and a higher image pixel. A smaller data bit width indicates a lower video data DR shown by the video bitstream and a lower image pixel. Generally, a data bit width for encoding the SDR data to obtain the SDR bitstream is 8 bits, and a data bit width for encoding the HDR data to obtain an HDR bitstream is 10 bits or 12 bits. In addition, a coding algorithm for the SDR data is not limited in this application, and may be any encoding/decoding algorithm such as MPEG-1, MPEG-2, MPEG-4, H.263, H.264, H.265, or JPEG.

The foregoing reconstructed data is SDR data obtained by decoding the first SDR bitstream. The reconstructed data is compared with the first HDR data, to determine the correspondence between the reconstructed data and the first HDR data. In an actual application, the correspondence may be determined by comparing a grayscale value, an RGB value, or a YUV value of a video image. This is not limited herein in this application.

It should be noted that a data bit width corresponding to the HDR data and a data bit width corresponding to the SDR data are usually different in size. For example, the data bit width corresponding to the HDR data is 10 bits, and the data bit width corresponding to the SDR data is 8 bits. The video encoding apparatus may convert, using a subtraction operation, a normalization operation, or the like, the target residual value between the first HDR data and the second HDR data into a data bit width that meets a transmission requirement of the first SDR bitstream. Because the data bit width corresponding to the SDR data is 8 bits, the data bit width of the target residual value is also 8 bits or less than 8 bits.

In this application, an SDR video decoding device and an HDR video decoding device are well supported based on the preset data and the SDR bitstream. If the bitstream is an SDR bitstream, the bitstream is explicitly identified as the SDR bitstream by the SDR video decoding device, to ensure SDR effect. Both the preset data and the SDR bitstream are correctly identified and decoded by the HDR device, to ensure HDR effect. It should be noted that, currently, large-bit width coding is not supported by all encoding/decoding standards. For example, JPEG supports only 8 bits, and both the target residual and an SDR are 8 bits. This can ensure that the video encoding apparatus and the video decoding apparatus can use a same-level codec. Generally, frame-level switching of a hardware encoder or a hardware decoder has high complexity and requires a high device processing capability. The target residual value is adjusted to be less than or equal to a bit width during encoding of the SDR bitstream. This can prevent frame-level switching of the hardware encoder or the hardware decoder at an encoder side and a decoder side.

In one embodiment, the correspondence may be determined in the following manner:

determining a first average value from the reconstructed data and the first HDR data, where the first average value is determined based on a preset parameter of a pixel at a first location in the first HDR data and the reconstructed data; splitting the reconstructed data into a plurality of image blocks and the first HDR data into a plurality of image blocks, where quantities and locations of the image blocks of the reconstructed data are respectively the same as those of the first HDR data; determining a second average value corresponding to each image block of the reconstructed data and each image block of the first HDR data; and determining the correspondence based on the first average value or the second average value. The correspondence determined in this manner is more accurate, and the determined second HDR data is more reliable.

In one embodiment, the preset parameter is a grayscale value, an RGB value, or a YUV value.

In one embodiment, the processing unit 502 is configured to:

perform subtraction on the second HDR data and the first HDR data, to determine an initial residual value; determine a residual mapping manner and a clamping manner based on distribution of a value range of the initial residual value; and map, in the residual mapping manner and the clamping manner, the initial residual value to the target residual value whose bit width is less than or equal to the first bit width.

It should be noted that the initial residual value is obtained through subtraction of grayscale values, RGB values, or YUV values at same locations in the second HDR data and the first HDR data. Values obtained through subtraction may be different. Statistical analysis may be performed on the initial residual value to obtain a histogram, and the histogram shows the distribution of the value range of the initial residual value. In an actual application, a curve chart is obtained by drawing dots without providing the initial residual value to show the distribution of the value range of the initial residual value. A manner of displaying the distribution of the value range of the initial residual value is not limited herein in this application.

In addition, when the initial residual value is converted into the target residual value, some values with a large error in an intermediate calculation process may affect a calculation result, and impact caused by the initial residual value with a large error during calculation may be eliminated in the clamping manner. Then, the video encoding apparatus may map the initial residual value to the target residual value in the residual mapping manner and the clamping manner that are determined based on the distribution of the value range of the initial residual value.

In one embodiment, the processing unit 502 is configured to:

determine a histogram based on the initial residual value; determine a residual value corresponding to a central location of the histogram; determine a first value range based on the first bit width and the residual value corresponding to the central location of the histogram; determine, based on the distribution of the value range of the initial residual value, a target proportion value of an initial residual that falls within the first value range; and perform residual mapping on the initial residual that falls within the first value range, and clamp an initial residual that does not fall within the first value range.

It should be noted that, after determining the distribution of the value range of the initial residual value, the video encoding apparatus may determine the first value range based on a value of the first bit width. The initial residual value within the first value range may be mapped to the target residual value whose bit width is less than or equal to the first bit width.

In one embodiment, the processing unit 502 is configured to:

determine a first residual value and a second residual value based on the target proportion value and the residual value corresponding to the central location of the histogram, where the first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value; and map an initial residual value that falls between the first residual value and the second residual value to the target residual value, and clamp an initial residual value that does not fall between the first residual value and the second residual value, to obtain a preset value.

The first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value.

It should be noted that, currently, large-bit width coding is not supported by all encoding/decoding standards. For example, JPEG supports only 8 bits, and both the target residual and an SDR are 8 bits. This can ensure that the video encoding apparatus and the video decoding apparatus can use a same-level codec. Generally, frame-level switching of a hardware encoder or a hardware decoder has high complexity and requires a high device processing capability. The target residual value is adjusted to be less than or equal to a bit width during encoding of the SDR bitstream. This can prevent frame-level switching of the hardware encoder or the hardware decoder at an encoder side and a decoder side.

When the image processing apparatus is a video decoding apparatus, the input/output unit 501 may be configured to receive a first SDR bitstream, where the first SDR bitstream includes preset data, and the preset data is obtained by encoding a correspondence and a target residual value; and the processing unit 502 may be configured to: map reconstructed data of the first SDR bitstream to second HDR data based on the correspondence, and determine first HDR data based on the target residual value and the second HDR data.

In one embodiment, the preset data further includes a residual mapping manner and a clamping manner.

In one embodiment, the processing unit 502 is configured to: determine a first residual value and a second residual value based on the residual mapping manner, the clamping manner, the target residual value, and a first bit width;

determine an initial residual value based on the first residual value, the second residual value, and the clamping manner, where a bit width of the initial residual value is greater than or equal to the first bit width; and determine the first HDR data based on the initial residual value and the second HDR data.

Figure 6:
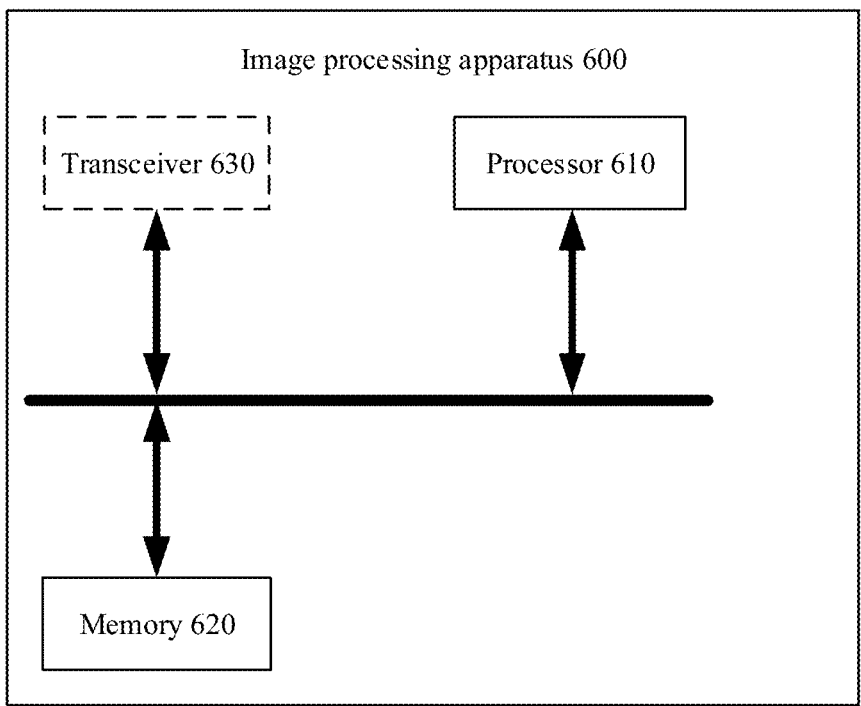
FIG. 6 is a schematic diagram of a structure of an image processing apparatus according to an embodiment of this application.

In addition, this application further provides an image processing apparatus 600 as shown in FIG. 6. For example, the image processing apparatus 600 may be a chip or a chip system. In one embodiment, in this embodiment of this application, the chip system may include a chip, or may include a chip and another discrete device.

The image processing apparatus 600 may include at least one processor 610. The image processing apparatus 600 may further include at least one memory 620, configured to store a computer program, program instructions, and/or data. The memory 620 is coupled to the processor 610. Coupling in this embodiment of this application may be indirect coupling or a communication connection between apparatuses, units, or modules, may be in an electrical form, a mechanical form, or another form, and is used for information exchange between the apparatuses, the units, or the modules. The processor 610 may perform an operation in cooperation with the memory 620. The processor 610 may execute the computer program stored in the memory 620. In one embodiment, the at least one memory 620 may alternatively be integrated with the processor 610.

In one embodiment, in an actual application, the image processing apparatus 600 may include or may not include a transceiver 630. A dashed box is used as an example in the figure. The image processing apparatus 600 may exchange information with another device by using the transceiver 630. The transceiver 630 may be a circuit, a bus, a transceiver, or any other apparatus that may be configured to exchange information.

In one embodiment, the image processing apparatus 600 may be used in the foregoing video encoding apparatus or the foregoing video decoding apparatus. The memory 620 stores a computer program, program instructions, and/or data for implementing a function of the video encoding apparatus or the video decoding apparatus in any one of the foregoing embodiments. The processor 610 may execute the computer program stored in the memory 620, to complete the method in any one of the foregoing embodiments.

A connection medium between the transceiver 630, the processor 610, and the memory 620 is not limited in embodiments of this application. In this embodiment of this application, in FIG. 6, the memory 620, the processor 610, and the transceiver 630 are connected to each other through a bus. The bus is represented by a thick line in FIG. 6. A manner of connection between other components is merely described as an example, but is not limited thereto. The bus may be classified into an address bus, a data bus, a control bus, or the like. For ease of indication, the bus is indicated by only one thick line in FIG. 6. However, it does not indicate that there is only one bus or only one type of bus. In embodiments of this application, the processor may be a general-purpose processor, a digital signal processor, an application-specific integrated circuit, a field-programmable gate array or another programmable logic device, a discrete gate or transistor logic device, or a discrete hardware component, and may implement or execute the methods, operations, and logical block diagrams disclosed in embodiments of this application. The general-purpose processor may be a microprocessor, any conventional processor or the like. The operations of the methods disclosed with reference to embodiments of this application may be directly performed and completed by a hardware processor, or may be performed and completed by a combination of hardware and software modules in the processor.

In embodiments of this application, the memory may be a nonvolatile memory, for example, a hard disk drive (HDD) or a solid-state drive (SSD), or may be a volatile memory, for example, a random access memory (RAM). Alternatively, the memory may be any other medium that can be configured to carry or store expected program code in a form of an instruction or a data structure and that can be accessed by a computer, but is not limited thereto. Alternatively, the memory in embodiments of this application may be a circuit or any other apparatus that can implement a storage function, and is configured to store a computer program, program instructions, and/or data.

Figure 7:
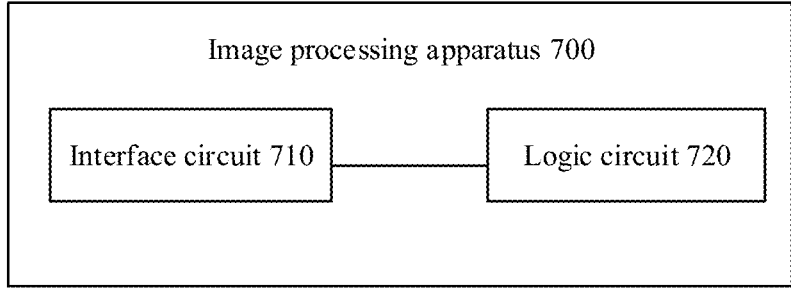
FIG. 7 is a schematic diagram of a structure of an image processing apparatus according to an embodiment of this application.

Based on the foregoing embodiments, as shown in FIG. 7, an embodiment of this application further provides another image processing apparatus 700, including an interface circuit 710 and a logic circuit 720. The interface circuit 710 may be understood as an input/output interface, and may be configured to perform the same operations as those of the input/output unit shown in FIG. 5 or the transceiver shown in FIG. 6. Details are not described herein again in this application. The logic circuit 720 may be configured to run code instructions to perform the method in any one of the foregoing embodiments, and may be understood as the processing unit in FIG. 5 or the processor in FIG. 6, and may implement the same function as the processing unit or the processor. Details are not described herein again in this application.

Based on the foregoing embodiments, an embodiment of this application further provides a readable storage medium. The readable storage medium stores instructions. When the instructions are executed, the method performed by the video encoding method or the video decoding method in any one of the foregoing embodiments is implemented. The readable storage medium may include any medium that can store program code, such as a USB flash drive, a removable hard disk drive, a read-only memory, a random access memory, a magnetic disk, or an optical disc.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact optical disc read-only memory (CD-ROM), an optical memory, and the like) that include computer-usable program code.

This application is described with reference to the flowcharts and/or the block diagrams of the method, the apparatus (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by the computer or the processor of the another programmable data processing apparatus generate an apparatus for implementing a function in one or more procedures in the flowcharts and/or in one or more blocks in the block diagrams.

These computer program instructions may be alternatively stored in a computer-readable memory that can indicate the computer or another programmable data processing apparatus to work in a manner, so that the instructions stored in the computer-readable memory generate an artifact that includes an instruction apparatus. The instruction apparatus implements a function in one or more procedures in the flowcharts and/or in one or more blocks in the block diagrams.

These computer program instructions may alternatively be loaded onto a computer or another programmable data processing apparatus, so that a series of operations are performed on the computer or another programmable apparatus to generate computer-implemented processing. Therefore, the instructions executed on the computer or another programmable apparatus provide operations for implementing a function in one or more procedures in the flowcharts and/or in one or more blocks in the block diagrams.

What is claimed is:

1. A video encoding method, comprising:
obtaining source data comprising first high dynamic range (HDR) data and a first standard dynamic range (SDR) bitstream for same video data;
mapping reconstructed data of the first SDR bitstream to second HDR data based on a correspondence between the reconstructed data of the first SDR bitstream and the first HDR data;
determining a target residual value between the second HDR data and the first HDR data, wherein a bit width of the target residual value is less than or equal to a first bit width, and the first bit width is a data bit width for encoding a first SDR video into the first SDR bitstream;
encoding the correspondence and the target residual value to determine preset data; and
transmitting the first SDR bitstream to which the preset data is added;
wherein the preset data further comprises a residual mapping manner and a clamping manner, wherein the residual mapping manner and the clamping manner indicates how the target residual value is determined.

2. The method according to claim 1, wherein the determining of the correspondence further comprises:
determining a first average value from the reconstructed data and the first HDR data based on a preset parameter of a pixel at a first location in the first HDR data and the reconstructed data;
splitting the reconstructed data into a plurality of image blocks and the first HDR data into a plurality of image blocks, wherein quantities and locations of the plurality of image blocks of the reconstructed data are respectively the same as those of the plurality of image blocks of the first HDR data;
determining a second average value corresponding to each of the plurality of image blocks of the reconstructed data and each of the plurality of image blocks of the first HDR data; and
determining the correspondence based on the first average value or the second average value.

3. The method according to claim 2, wherein the preset parameter is a grayscale value, an RGB value, or a YUV value.

4. The method according to claim 1, wherein the determining the target residual value between the second HDR data and the first HDR data comprises:

performing subtraction on the second HDR data and the first HDR data to determine an initial residual value;

determining the residual mapping manner and the clamping manner based on distribution of a value range of the initial residual value; and mapping, in the residual mapping manner and the clamping manner, the initial residual value to the target residual value whose bit width is less than or equal to the first bit width.

5. The method according to claim 4, wherein the determining the residual mapping manner and the clamping manner further comprises:

determining a histogram based on the initial residual value;

determining a residual value corresponding to a central location of the histogram;

determining a first value range based on the first bit width and the residual value corresponding to the central location of the histogram;

determining, based on the distribution of the value range of the initial residual value, a target proportion value of an initial residual that falls within the first value range; and performing residual mapping on the initial residual that falls within the first value range, and clamping the initial residual value that does not fall within the first value range.

6. The method according to claim 5, wherein the mapping, in the residual mapping manner and the clamping manner, further comprises:

determining a first residual value and a second residual value based on the target proportion value and the residual value corresponding to the central location of the histogram, wherein the first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value; and mapping the initial residual value that falls between the first residual value and the second residual value to the target residual value, and clamping the initial residual value that does not fall between the first residual value and the second residual value to obtain a preset value.

7. A video decoding method, comprising:

receiving a first standard dynamic range (SDR) bitstream, wherein the first SDR bitstream comprises preset data, and the preset data is obtained by encoding a correspondence and a target residual value;

mapping reconstructed data of the first SDR bitstream to second high dynamic range (HDR) data based on the correspondence; and determining first HDR data based on the target residual value and the second HDR data;

wherein the preset data further comprises a residual mapping manner and a clamping manner, wherein the residual mapping manner and the clamping manner indicates how the target residual value is determined.

8. The method according to claim 7, wherein the determining the first HDR data further comprises:

determining a first residual value and a second residual value based on the residual mapping manner, the clamping manner, the target residual value, and a first bit width;

determining an initial residual value based on the first residual value, the second residual value, and the clamping manner, wherein a bit width of the initial residual value is greater than or equal to the first bit width; and determining the first HDR data based on the initial residual value and the second HDR data.

9. The method according to claim 7, further comprising:

parsing the preset data from the first SDR bitstream.

10. A video encoding apparatus, comprising:

a processor; and a nonvolatile memory coupled to the processor, wherein the processor invokes program code stored in the memory to:

obtain source data, wherein the source data comprises first high dynamic range (HDR) data and a first standard dynamic range (SDR) bitstream for same video data;

map reconstructed data of the first SDR bitstream to second HDR data based on a correspondence between the reconstructed data of the first SDR bitstream and the first HDR data;

determine a target residual value between the second HDR data and the first HDR data, wherein a bit width of the target residual value is less than or equal to a first bit width, and the first bit width is a data bit width for encoding a first SDR video into the first SDR bitstream;

encode the correspondence and the target residual value, to determine preset data; and transmit the first SDR bitstream to which the preset data is added;

wherein the preset data further comprises a residual mapping manner and a clamping manner, wherein the residual mapping manner and the clamping manner indicates how the target residual value is determined.

11. The video encoding apparatus according to claim 10, wherein the processor invokes the program code stored in the memory further to:

determine a first average value from the reconstructed data and the first HDR data based on a preset parameter of a pixel at a first location in the first HDR data and the reconstructed data;

split the reconstructed data into a plurality of image blocks and the first HDR data into a plurality of image blocks, wherein quantities and locations of the plurality of image blocks of the reconstructed data are respectively the same as those of the plurality of image blocks of the first HDR data;

determine a second average value corresponding to each of the plurality of image blocks of the reconstructed data and each of the plurality of image blocks of the first HDR data; and determine the correspondence based on the first average value or the second average value.

12. The video encoding apparatus according to claim 11, wherein the preset parameter is a grayscale value, an RGB value, or a YUV value.

13. The video encoding apparatus according to claim 10, wherein the processor invokes the program code stored in the memory further to:

perform subtraction on the second HDR data and the first HDR data to determine an initial residual value;

determine the residual mapping manner and the clamping manner based on distribution of a value range of the initial residual value; and map, in the residual mapping manner and the clamping manner, the initial residual value to the target residual value whose bit width is less than or equal to the first bit width.

14. The video encoding apparatus according to claim 13, wherein the processor invokes the program code stored in the memory further to:

determine a histogram based on the initial residual value;

determine a residual value corresponding to a central location of the histogram;

determine a first value range based on the first bit width and the residual value corresponding to the central location of the histogram;

determine, based on the distribution of the value range of the initial residual value, a target proportion value of an initial residual that falls within the first value range; and perform residual mapping on the initial residual that falls within the first value range, and clamping an initial residual that does not fall within the first value range.

15. The video encoding apparatus according to claim 14, wherein the processor invokes the program code stored in the memory further to:

determine a first residual value and a second residual value based on the target proportion value and the residual value corresponding to the central location of the histogram, wherein the first residual value is less than the residual value corresponding to the central location of the histogram, the second residual value is greater than the residual value corresponding to the central location of the histogram, there is at least one first residual value, there is at least one second residual value, the first residual value and the residual value corresponding to the central location of the histogram correspond to a first proportion value, the second residual value and the residual value corresponding to the central location of the histogram correspond to a second proportion value, and a sum of the first proportion value and the second proportion value is the target proportion value; and map the initial residual value that falls between the first residual value and the second residual value to the target residual value, and clamping the initial residual value that does not fall between the first residual value and the second residual value to obtain a preset value.

16. A video decoding apparatus, comprising:

a processor; and a nonvolatile memory coupled to the processor, wherein the processor invokes program code stored in the memory to:

receive a first standard dynamic range (SDR) bitstream, wherein the first SDR bitstream comprises preset data, and the preset data is obtained by encoding a correspondence and a target residual value;

map reconstructed data of the first SDR bitstream to second high dynamic range (HDR) data based on the correspondence; and determine first HDR data based on the target residual value and the second HDR data;

wherein the preset data further comprises a residual mapping manner and a clamping manner, wherein the residual mapping manner and the clamping manner indicates how the target residual value is determined.

17. The video decoding apparatus according to claim 16, wherein the processor invokes the program code stored in the memory further to:

determine a first residual value and a second residual value based on the residual mapping manner, the clamping manner, the target residual value, and a first bit width;

determine an initial residual value based on the first residual value, the second residual value, and the clamping manner, wherein a bit width of the initial residual value is greater than or equal to the first bit width; and determine the first HDR data based on the initial residual value and the second HDR data.

18. The video decoding apparatus according to claim 16, wherein the processor invokes the program code stored in the memory further to:

parse the preset data from the first SDR bitstream.

* * * * *